United States Patent
Bharadwaj

(10) Patent No.: US 8,556,156 B1
(45) Date of Patent: Oct. 15, 2013

(54) DYNAMIC ADJUSTMENT OF FRICTION STIR WELDING PROCESS PARAMETERS BASED ON WELD TEMPERATURE

(75) Inventor: Shravan Bharadwaj, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/599,097

(22) Filed: Aug. 30, 2012

(51) Int. Cl.
*B23K 20/12* (2006.01)

(52) U.S. Cl.
USPC ............ 228/102; 228/2.1; 228/9; 228/103; 228/112.1

(58) Field of Classification Search
None
See application file for complete search history.

(56) References Cited

U.S. PATENT DOCUMENTS

| | | | |
|---|---|---|---|
| 7,216,793 B2 | 5/2007 | Stotler et al. | |
| 7,992,761 B2 | 8/2011 | Baumann et al. | |
| 8,011,560 B2 | 9/2011 | Chen et al. | |
| 8,047,417 B2 | 11/2011 | Hochhalter et al. | |
| 2001/0052561 A1* | 12/2001 | Wollaston et al. | 244/132 |
| 2004/0004107 A1* | 1/2004 | Litwinski | 228/56.3 |
| 2004/0074944 A1* | 4/2004 | Okamoto et al. | 228/2.1 |
| 2004/0074948 A1* | 4/2004 | Kusunoki et al. | 228/112.1 |
| 2004/0134971 A1* | 7/2004 | Narita et al. | 228/112.1 |
| 2005/0006438 A1* | 1/2005 | Andersson et al. | 228/112.1 |
| 2005/0029330 A1* | 2/2005 | Kohn | 228/112.1 |
| 2005/0051602 A1* | 3/2005 | Babb et al. | 228/112.1 |
| 2006/0065698 A1* | 3/2006 | Ishikawa et al. | 228/112.1 |
| 2007/0164086 A1* | 7/2007 | Hochhalter et al. | 228/112.1 |
| 2007/0228104 A1* | 10/2007 | Mankus et al. | 228/101 |
| 2008/0099533 A1* | 5/2008 | Hanlon et al. | 228/112.1 |
| 2009/0014497 A1* | 1/2009 | Ryu | 228/2.3 |
| 2009/0188101 A1* | 7/2009 | Durandet et al. | 29/525.01 |
| 2009/0255980 A1* | 10/2009 | Li et al. | 228/102 |
| 2010/0078462 A1* | 4/2010 | Babb et al. | 228/102 |
| 2010/0083480 A1* | 4/2010 | Carter | 29/432 |
| 2010/0159265 A1* | 6/2010 | Fairchild et al. | 428/586 |
| 2010/0243714 A1* | 9/2010 | Allehaux et al. | 228/104 |
| 2010/0326962 A1 | 12/2010 | Calla et al. | |
| 2011/0079339 A1* | 4/2011 | Cruz et al. | 156/64 |
| 2011/0172802 A1* | 7/2011 | Babb et al. | 700/103 |
| 2012/0185075 A1* | 7/2012 | Babb et al. | 700/145 |
| 2012/0261457 A1* | 10/2012 | Ohashi et al. | 228/102 |

FOREIGN PATENT DOCUMENTS

| | | | |
|---|---|---|---|
| JP | 2000-301361 A | * | 10/2000 |
| JP | 2006-187778 A | * | 7/2006 |
| JP | 2011-115842 A | * | 6/2011 |
| WO | WO 2007/006669 A1 | * | 1/2007 |

* cited by examiner

*Primary Examiner* — Kiley Stoner
(74) *Attorney, Agent, or Firm* — Womble Carlyle Sandridge & Rice LLP

(57) ABSTRACT

A method for friction stir welding is provided. The method may include beginning a friction stir welding operation by directing a rotating friction stir welding tool along a joint between two parts. A temperature of the resulting weld may be measured. Thereby, a controller may adjust process parameters associated with the friction stir welding process to decrease a difference between desired and measured temperatures of the weld. The desired temperature may correspond to a temperature at which the parts are plasticized. The process parameters may include rotational speed of the friction stir welding tool, feed rate, axial force along the length of the friction stir welding tool, and tilt angle of the friction stir welding tool.

20 Claims, 11 Drawing Sheets

DYNAMIC ADJUSTMENT OF FRICTION STIR WELDING PROCESS PARAMETERS BASED ON WELD TEMPERATURE

TECHNICAL FIELD

The present disclosure relates generally to friction stir welding, and more particularly to methods, apparatuses, and computer program products for improving the quality of welds produced by friction stir welding.

BACKGROUND

Various types of methods and apparatuses have been developed for joining two parts. Example embodiments of methods for joining two parts include adhesive bonding, welding, use of fasteners, etc. In the context of joining certain materials, such as metals, welding has been identified as a suitable method presently in use today.

Various forms of welding methods exist. Example embodiments of welding methods include laser welding, arc welding, gas welding, and friction stir welding. Friction stir welding may present certain advantages over other forms of welding. For example, friction stir welding may not involve heating the parts being welded to as great of an extent as other forms of welding. Further, friction stir welding may not require use of flux or gases which could introduce contaminants into the weld. However, the formation of suitably strong and aesthetically appealing welds using friction stir welding may present certain challenges.

Accordingly, apparatuses and methods for improved friction stir welding are provided.

SUMMARY

A method for friction stir welding is provided. The method may be conducted by various systems for friction stir welding. For example, such a system for friction stir welding may include a friction stir welding tool, a motor to rotate the friction stir welding tool, an actuator to move the friction stir welding tool and apply force against the parts being welded, one or more sensors configured to determine the temperature of the resulting weld, and a controller configured to control process parameters associated with operating the friction stir welding system.

The method may include beginning a friction stir welding operation by directing a rotating friction stir welding tool along the joint between the two parts being welded. As friction stir welding begins the temperature of the weld created by the friction stir welding tool may be measured. Thereby, based on the feedback from the temperature sensor(s), one or more process parameters associated with the friction stir welding operation may be adjusted.

The process parameters may include the rotational speed of the friction stir welding tool, the feed rate at which the friction stir welding tool moves across the length of the joint, the axial force applied along the length of the friction stir welding tool against the parts being welded, and a tilt angle of the friction stir welding tool. By adjusting the process parameters while the friction stir welding process is ongoing, a temperature differential between a measured temperature of the weld and a desired temperature of the weld may be decreased. In this regard, the desired temperature may correspond to a temperature at which the parts are plasticized, which is the temperature at which friction stir welding ideally occurs.

Related computer code for controlling a friction stir welding system is also provided.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed assemblies, methods, and systems. These drawings in no way limit any changes in form and detail that may be made to the disclosure by one skilled in the art without departing from the spirit and scope of the disclosure.

DETAILED DESCRIPTION

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

Friction stir welding is a method for joining two parts which may present certain advantages over other forms of welding. For example, friction stir welding may not heat the parts being welded to as great of an extent as other forms of welding. In this regard, certain materials may not be able to withstand temperatures associated with other forms of welding. Further, subjecting the parts to high heat may cause the parts to warp. Stresses may also build at the joint between the parts as a result of the heat that may eventually lead to failure of the weld.

Additionally, friction stir welding be advantageous in that it may not require use of flux or gases which could introduce contaminants into the weld. Introduction of contaminants into the weld may affect other operations later performed on the parts. For example, it may be more difficult to anodize the parts when contaminants have been introduced into the weld.

Friction-stir welding is a solid-state joining process (meaning the metal is not melted) and may be used in applications where the original metal characteristics must remain unchanged as far as possible. Friction stir welding functions by mechanically intermixing the two pieces of metal at the place of the joint, transforming them into a softened state that allows the metal to be fused using mechanical pressure. This process is primarily used on aluminum, although other materials may be welded, and is most often used on large pieces which cannot be easily heat treated post weld to recover temper characteristics.

Figure 1:
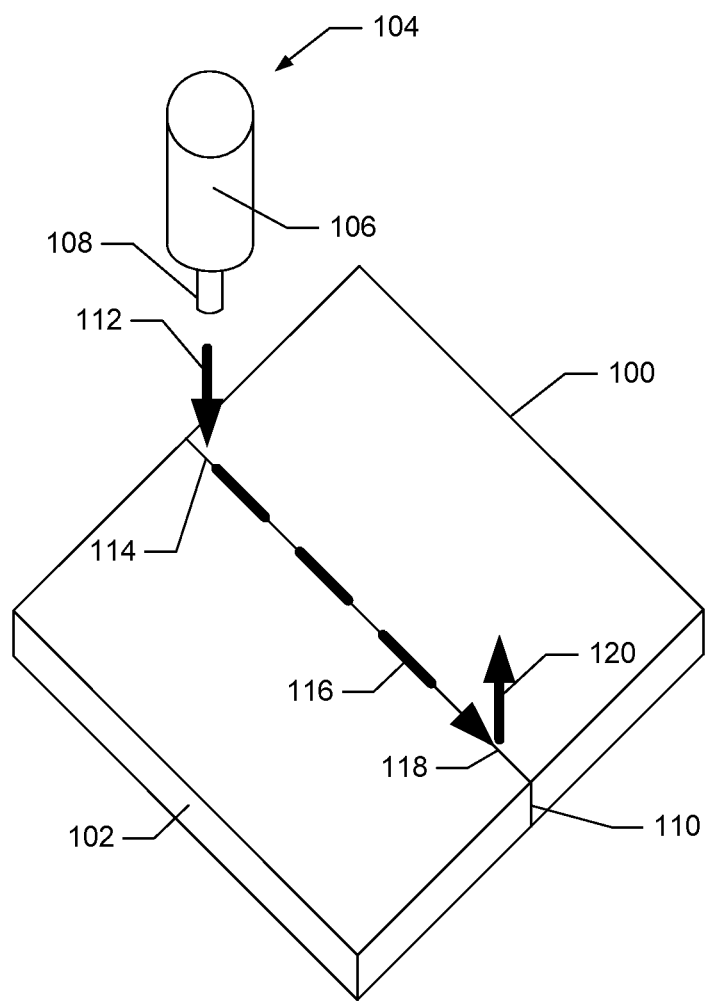
FIG. 1 illustrates a perspective view of operations performed in friction stir welding.

FIG. 1 schematically illustrates an example embodiment of the friction stir welding process. As illustrated, a first part 100 can be joined to a second part 102 via friction stir welding using a constantly rotated friction stir welding tool 104 including a shoe 106 and a pin 108 extending therefrom. In order to weld the first part 100 and the second part 102 together along a joint 110 therebetween, the friction stir welding tool 104 may initially be inserted into the joint, for example, by directing the tool downwardly along a path 112 at a starting point 114. The tool 104 may then be transversely fed along a path 116 along the joint 110 between the first part 100 and the second part 102, which may be clamped together. The pin 108 may be slightly shorter than the weld depth required, with the shoe 106 riding atop the work surface.

Frictional heat is generated between the wear-resistant welding components defining the friction stir welding tool 104 and the parts 100, 102 being welded. This heat, along with that generated by the mechanical mixing process and the adiabatic heat within the material, cause the stirred materials to soften and plasticize without melting. As the pin 108 is moved forward along the path 116 the plasticized material moves to the rear where clamping force assists in a forged consolidation of the weld. This process of the friction stir welding tool 104 traversing along the weld line in a plasticized tubular shaft of material may result in severe solid state deformation involving dynamic recrystallization of the base material. After traversing the path 116 at the joint 110, the friction stir welding tool 104 may be lifted from the material at an end point 118 upwardly along a path 120. Accordingly, a weld may be created along the joint 110 between the starting point 114 and the end point 118.

The formation of a weld via friction stir welding with desirable strength and cosmetic properties may present certain issues. Traditional friction stir welding may involve trial and error with respect to determining various process parameters employed during the friction stir welding process. In this regard, friction stir welding may involve setting a friction stir welding tool rotational speed at a fixed number, and then testing various feed rates and/or axial forces to determine which parameters work best. Once these process parameters are determined, they may be repeatedly employed during the friction stir welding of each pair of parts when multiple units of a product are being manufactured.

However, this process may not result in high-quality welds for each pair of parts that are welded. In this regard, certain differences in the size and shape of parts may exist between the parts within manufacturing tolerances. Further, ambient conditions may vary during the welding processes, which may affect the temperature, size, and/or shape of the parts. Additionally, a welding operation may be stopped and restarted during the manufacturing process for a variety of reasons. Thereby, the temperature of the parts at the start/stop locations may differ from that during a continuous welding operation. The above-described variations in the conditions associated with friction stir welding may make friction stir welding with pre-defined welding parameters suffer from inconsistent results.

Figure 2:
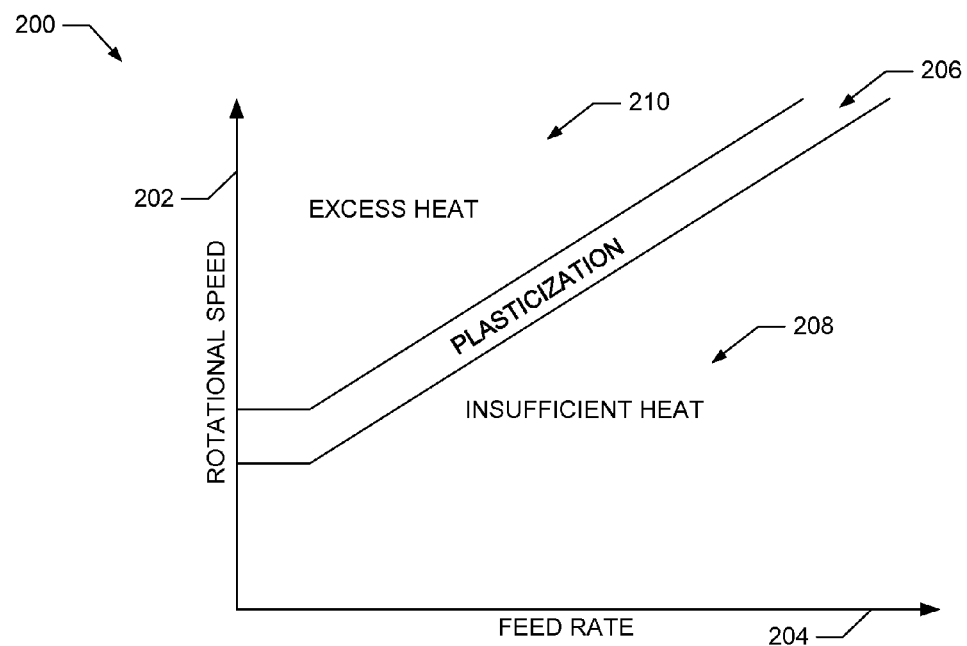
FIG. 2 illustrates a temperature response curve based on changes in rotational speed and feed rate during a friction stir welding operation.

As noted above, the production of a high-quality weld via friction stir welding may require heating the parts being welded to the proper temperature such that the parts plasticize at the joint, but do not melt. In this regard, FIG. 2 illustrates a graph 200 of a temperature response curve based on changes in a rotational speed 202 of a friction stir welding tool and a feed rate 204 of the friction stir welding. As illustrated, various combinations of rotational speeds 202 and feed rates 204 may produce a plasticization region 206 in which the parts being welded are heated to the proper temperature such that they are plasticized and may properly intermix to form an ideal weld. However, an insufficient heat region 208 may also be produced where combinations of rotational speeds 202 and feed rates 204 produce insufficient heat to plasticize the parts being welded and thereby intermixing between the parts is hindered and the parts may not properly join. Conversely, an excess heat region 210 may be produced where rotational speeds 202 and feed rates 204 combine to produce heat beyond a temperature at which the materials plasticize. Accordingly, the parts may melt in the excess heat region 210, resulting in a poor weld.

However, Applicant has identified that various other process parameters may affect the temperature of the parts being welded. For example, the axial force applied along the length of the friction stir welding tool against the parts being welded and the tilt angle of the friction stir welding tool may also affect the temperature of the parts being welded, and hence the conditions under which the parts plasticize. Temperature response curves may be determined for each of these process parameters. For example, the temperature response curves may be determined via finite element analysis (FEA) conducted on a computer model of the parts that are to be welded. Alternatively, the temperature response curves may be determined empirically by adjusting the process parameters and recording the resulting change in the temperature of the weld. For example, one process parameter may be changed at a time to avoid confusion with respect to the cause of the resulting temperature change.

Figure 3:
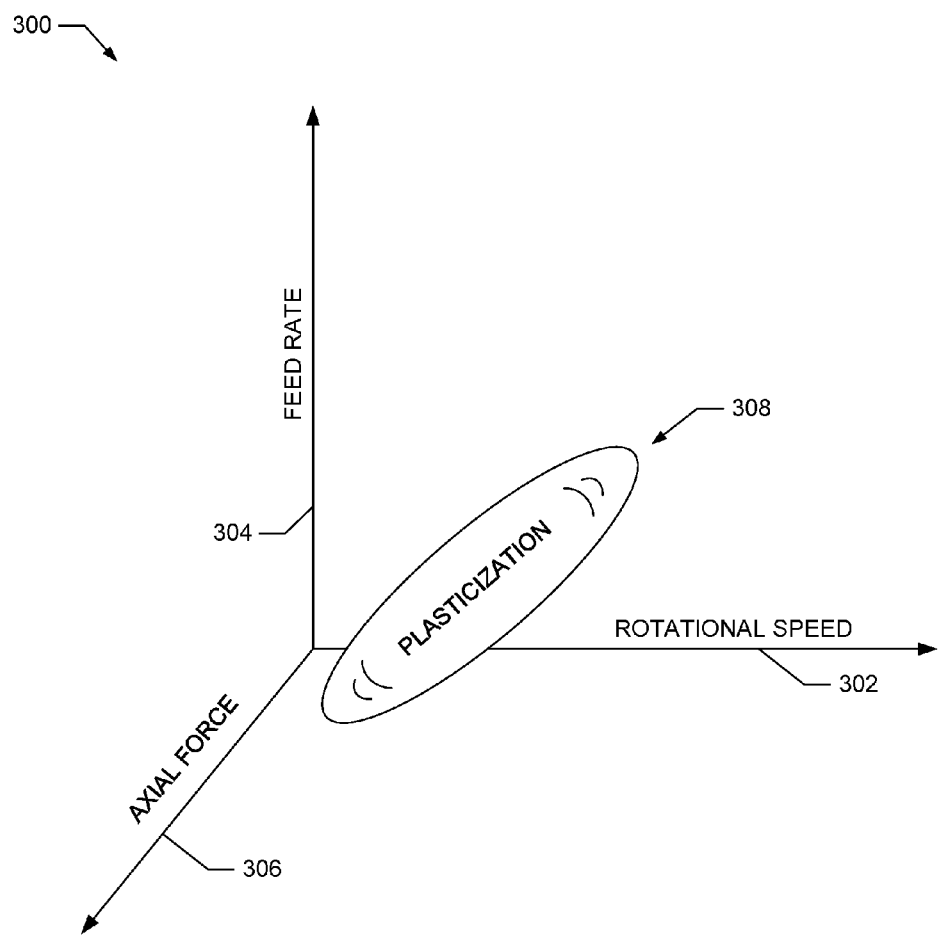
FIG. 3 illustrates a three-dimensional temperature response curve based on changes in rotational speed, feed rate, and axial force during a friction stir welding operation.

FIG. 3 illustrates a three-dimensional graph 300 of a temperature response curve based on changes in a rotational speed 302 of a friction stir welding tool, a feed rate 304 of the friction stir welding tool, and an axial force 306 applied along the length of the friction stir welding tool against the parts being welded. In this regard, multiple temperature response curves may be combined into a three-dimension format in some embodiments. As illustrated, the three process parameters 302, 304, 306 may produce a plasticized region 308 in certain combinations. Note that the graphs provided in FIGS. 2 and 3 generically illustrate the resulting plasticization regions. In this regard, the characteristics of the plasticization regions may vary depending upon the type of material being welded, amongst other factors.

Figure 4:
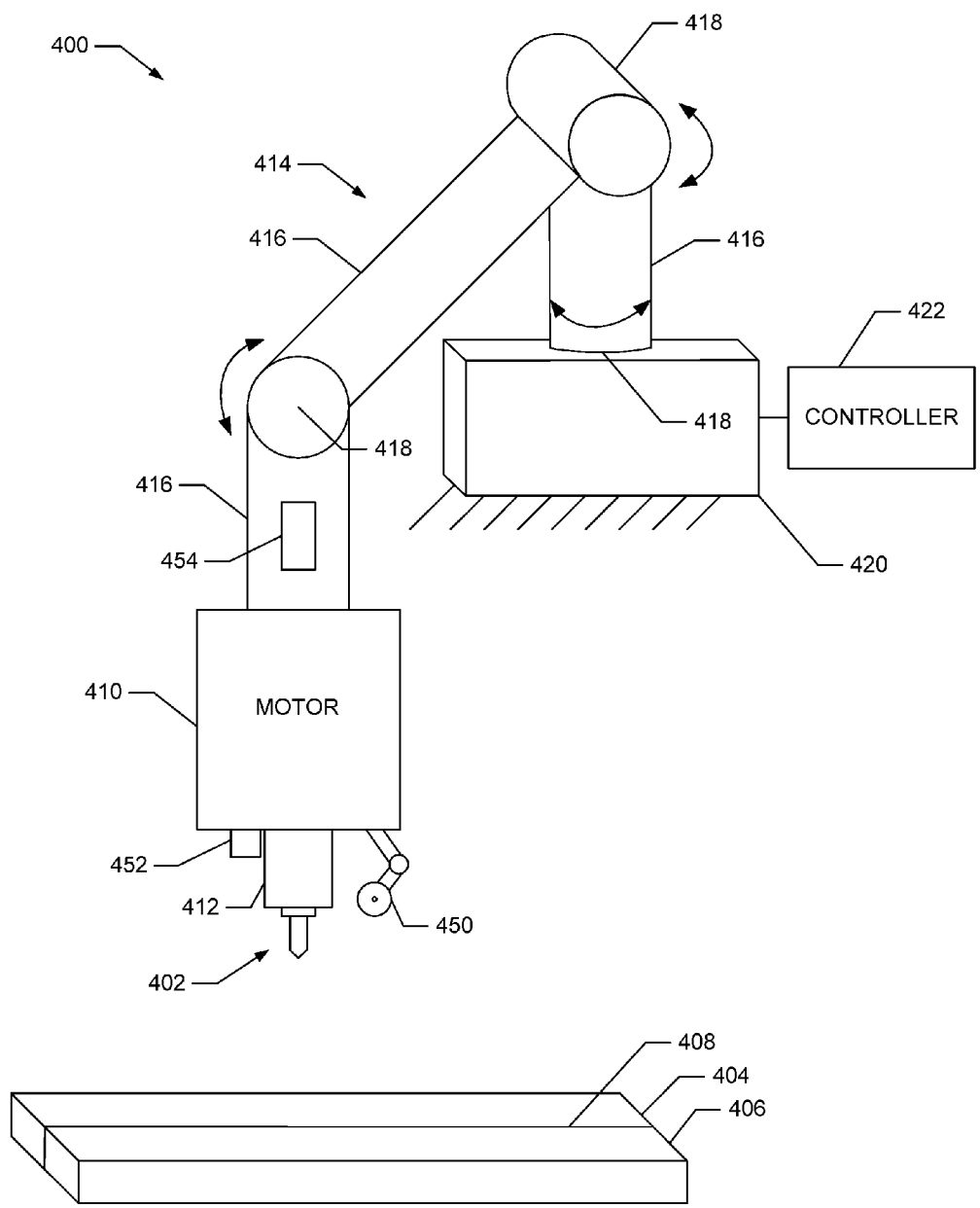
FIG. 4 illustrates a schematic view of a system for friction stir welding according to an example embodiment of the present disclosure.

Accordingly, Applicant has determined that in order to produce an ideal weld, it may be desirable to actively control the process parameters during friction stir welding to achieve a desired weld temperature within the plasticization region. In this regard, FIG. 4 illustrates a friction stir welding system 400 according to an embodiment of the present disclosure. The friction stir welding system 400 may include a friction stir welding tool 402 configured to friction stir weld a first part 404 to a second part 406 along a joint 408 therebetween. In the illustrated embodiment the first part 404 and the second part 406 are positioned in a butt joint configuration. However, the first part 404 and the second part 406 may be welded together in various configurations.

A motor 410 may be configured to rotate the friction stir welding tool 402 by rotating a spindle 412 coupled therebetween. Further, an actuator 414 may be configured to apply an axial force along the friction stir welding tool 402 against the first part 404 and the second part 406. Further, the actuator 414 may displace the friction stir welding tool 402 relative to the first part 404 and the second part 406 along the joint 408 therebetween. In the illustrated embodiment, the actuator 414 comprises a robotic assembly. As illustrated, the robotic assembly may include one or more arms 416, one or more joints 418, and a base 420. Thus, the arms 416 may be rotated about the joints 418 to position the friction stir welding tool 402 at an appropriate position to friction stir weld the joint 408 between the parts 404, 406. However, various other embodiments of actuators (e.g., gantry systems) may be employed to control the position of the friction stir welding tool 402 relative to the parts 404, 406 being welded.

Regardless of the particular embodiment of actuator employed, the friction stir welding system 400 may further comprise a controller 422. The controller 422 may be configured to control the actuator 414, the motor 410, and/or or other portions of the friction stir welding system 400. Thus, the system 400 may be employed to weld together the first part 404 and the second part 406 along a joint 408 therebetween. A fixture, which is not shown for clarity purposes, may be employed to hold the parts 404, 406 in position and/or compress the parts against one-another along the joint 408 during friction stir welding.

Figure 5:
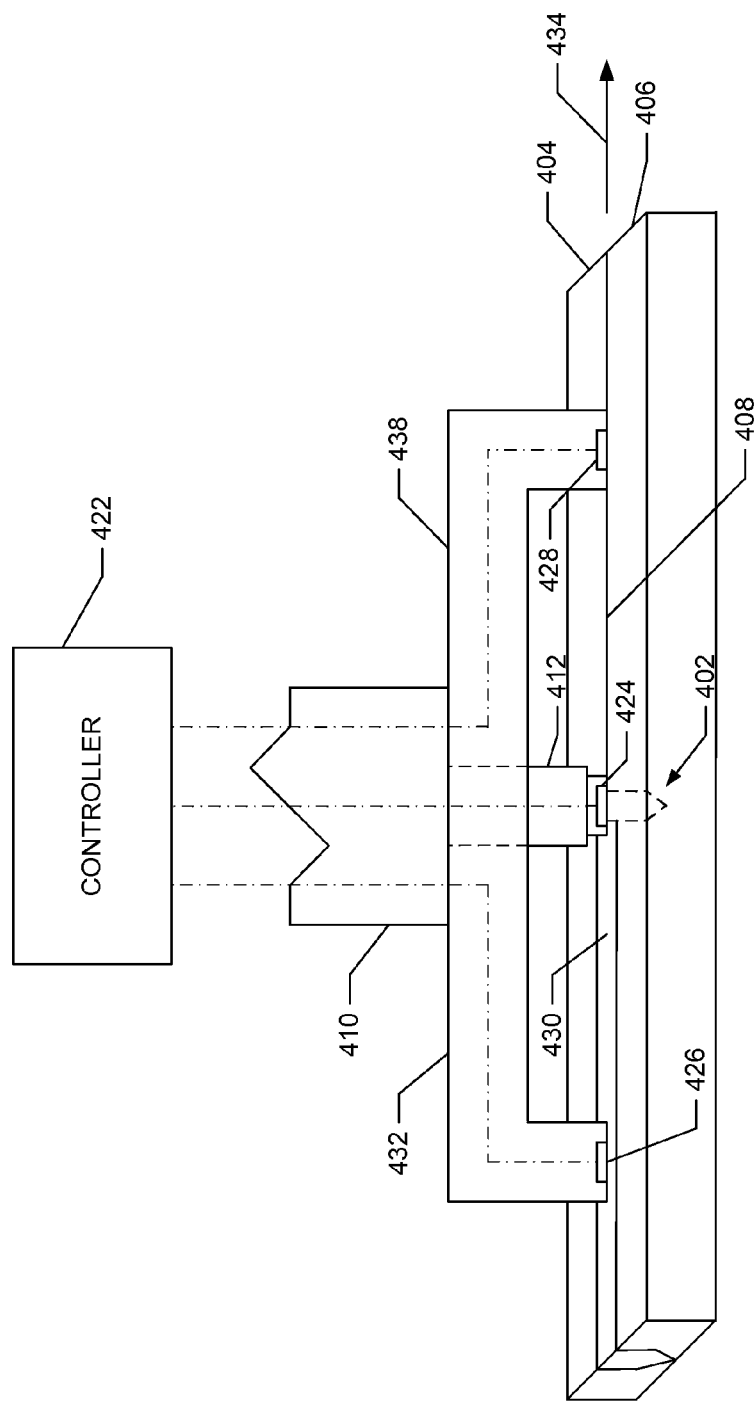
FIG. 5 illustrates a partial perspective view of the friction stir welding system of FIG. 4 comprising a plurality of temperature sensors mounted at a fixed distance from a friction stir welding tool according to an example embodiment of the present disclosure.

As further illustrated in FIG. 5, the system 400 may additionally include one or more sensors 424, 426, 428 configured to measure a temperature of at least one of the first part 404 and the second part 406. More particularly, the sensors may include a temperature sensor 424 positioned proximate the friction stir welding tool 402. This sensor 424 may be in contact with the friction stir welding tool 402 to indirectly determine the temperature of a weld 430 produced between the first part 404 and the second part 406 as a result of the friction stir welding tool rotating therein.

The sensors may additionally or alternatively include a downstream temperature sensor 426 that determines a temperature of the weld 430 produced between the first part 404 and the second part 406 downstream from the friction stir welding tool 402. In this regard, the downstream temperature sensor 426 may be mounted to an arm 432 that positions the downstream temperature sensor behind the friction stir welding tool 402 in terms of a welding direction 434. Either by determining the temperature of the parts 404, 406 at the friction stir welding tool 402 or slightly downstream therefrom, the temperature sensors 424, 436 may be employed to determine the temperature to which the parts are heated by the friction stir welding process.

Accordingly, various process parameters may be adjusted to reach a desired temperature of the weld 430 resulting from the friction stir welding process. Note that the initial friction stir welding process parameters may be empirically determined, as described above, through trial and error. The initial process parameters may then be adjusted based on feedback provided in the form of the resulting temperature of the weld, as described below.

The sensors may also include an upstream temperature sensor 428 that is configured to determine a temperature of the first part 404 and/or the second part 406 upstream of the friction stir welding tool 402. In this regard, the upstream temperature sensor 428 may be mounted to an arm 438 that positions the upstream temperature sensor in front of the friction stir welding tool 402 in terms of the welding direction 434. By determining the temperature of the part(s) 404, 406 upstream of the friction stir welding tool 402, the temperature of the parts prior to friction stir welding may be known. Since the initial temperature of the parts 404, 406 prior to friction stir welding may affect the resulting temperature of the weld 430, it may be desirable to know the initial temperature of the parts such that the process parameters may be adjusted to reach a desired temperature of the weld, as discussed below.

In some embodiments the parts 404, 406 may be preheated prior to welding. By preheating the first part 404 and the second part 406, the required heat produced by friction through rotating the friction stir welding tool 402 may be reduced. In this regard, since the preheated first and second parts 404, 406 require less additional heat to reach a plasticized state that allows for intermixing of the materials defining the first and second parts, the friction stir welding tool 402 may rotate at a lower speed. Accordingly, the life of the friction stir welding tool 402 may be prolonged. Further, since the first and second parts 404, 406 may more easily intermix as a result of the preheating thereof, the speed at which the friction stir welding tool 402 traverses the joint 408 may be increased. However, preheating may not be conducted in all embodiments.

Figure 6:
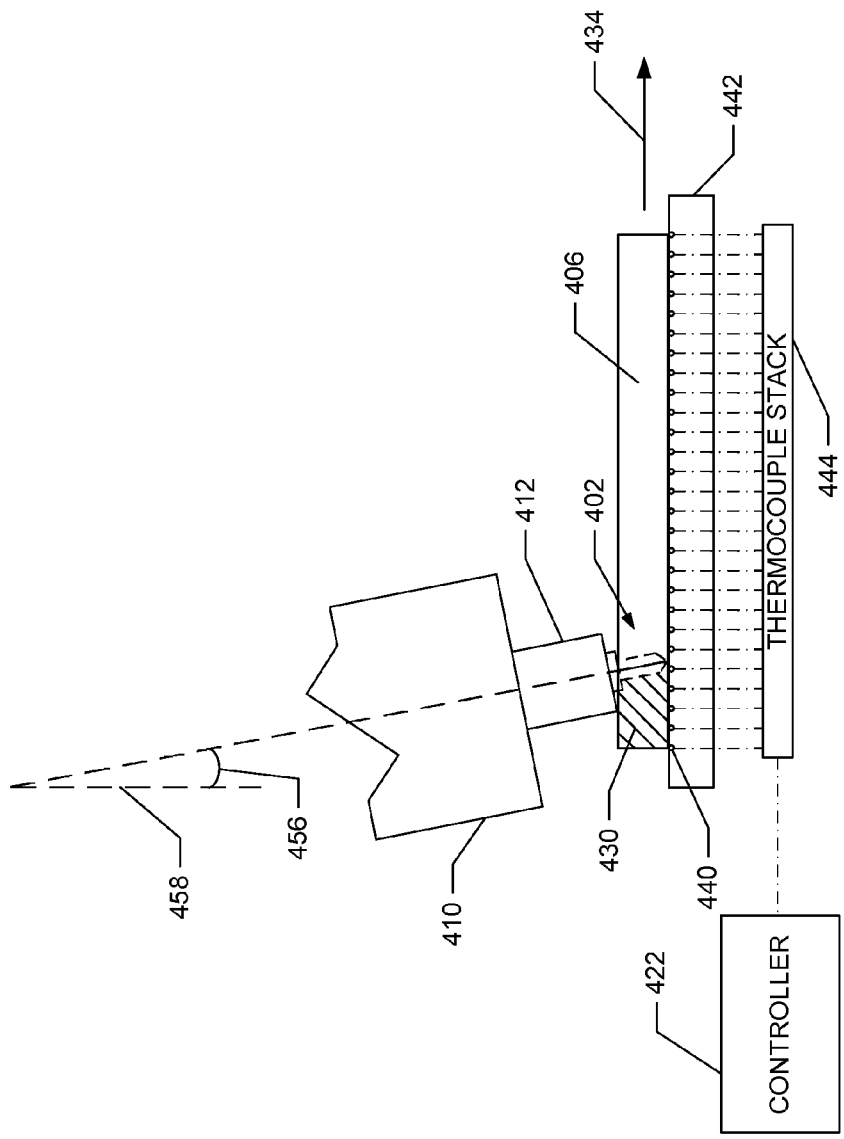
FIG. 6 illustrates a partial side view of the friction stir welding system of FIG. 4 comprising a plurality of temperature sensors mounted in a backing plate according to an example embodiment of the present disclosure.

In an alternate embodiment sensors may be mounted in a fixture, instead of fixed relative to the friction stir welding tool 402. For example, FIG. 6 illustrates an embodiment in which temperature sensors 440 are mounted in a backing plate 442 upon which the first and second parts 404, 406 are placed during friction stir welding. As illustrated, a thermocouple stack 444 comprising the temperature sensors 440 may extend along the length of the backing plate 442 (or at least a portion thereof) such that the temperature sensors extend along the length of the parts 404, 406 being welded. Accordingly, the temperature of the first part 404 and/or the second part 406 may be measured at the friction stir welding tool 402 and/or slightly downstream of the friction stir welding tool to determine a temperature of the weld 430. Additionally, the temperature sensors 440 may measure a temperature of the first part 404 and/or the second part 406 upstream of the friction stir welding tool 402 in order to determine an initial temperature of the parts.

Figure 7:
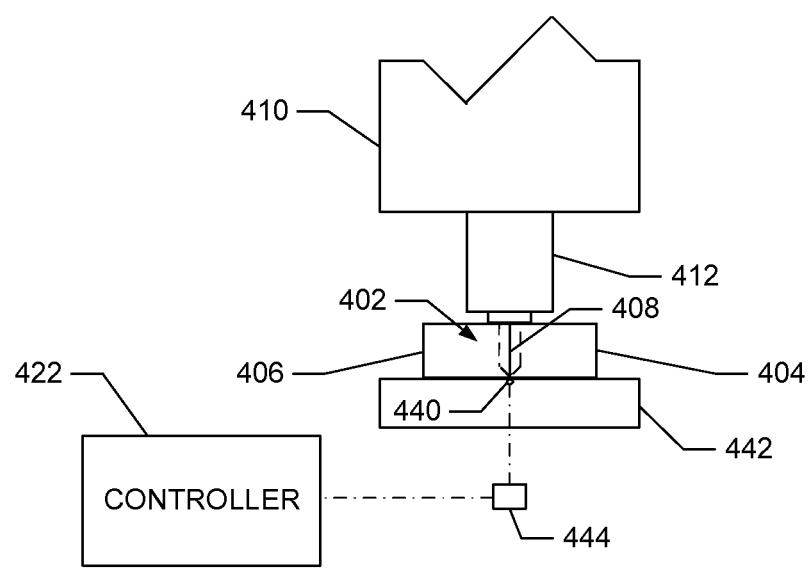
FIG. 7 illustrates an end view of the portion of the friction stir welding system illustrated in FIG. 6.

As illustrated in FIG. 7, in one embodiment the temperature sensors 440 in the backing plate 442 may be positioned along the joint 408 between the parts 404, 406. Accordingly, the temperature of the weld 430 may be determined by placing the temperature sensors 440 proximate the joint 408.

However, in alternate embodiments the temperature sensors 440 may be placed in different locations.

Figure 8:
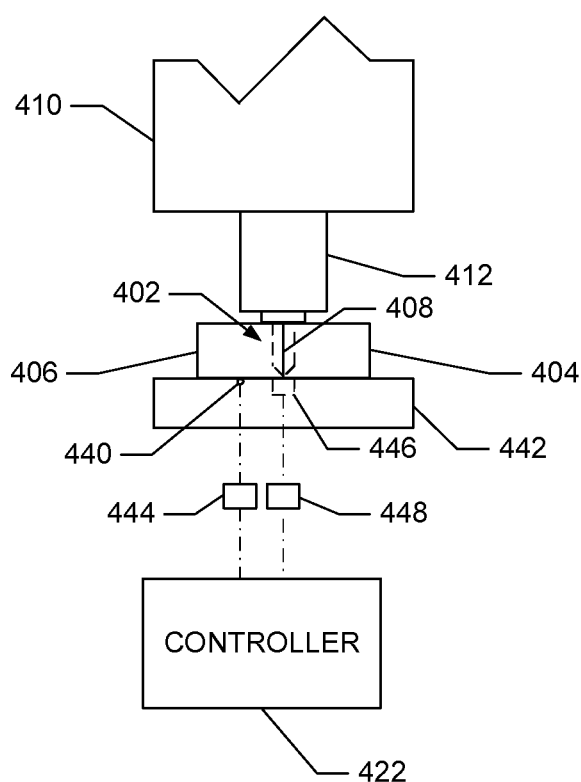
FIG. 8 illustrates an end view of a portion of the friction stir welding system of FIG. 4 comprising a plurality of temperature sensors and a plurality of proximity sensors mounted in a backing plate, the temperature sensors perpendicularly displaced from a joint between parts being welded and the proximity sensors aligned with the joint according to an example embodiment of the present disclosure.

For example, FIG. 8 illustrates an embodiment in which the temperature sensors 440 are mounted in the backing plate 442, but perpendicularly displaced from the joint 408 between the parts 404, 406. In some embodiments the controller 422 may account for any variation in the temperature of the part 404, 406 at the location of the temperature sensor 440 and the temperature of the weld 430 at the joint 408. For example, this temperature variation may be determined empirically.

As further illustrated in FIG. 8, in some embodiments the friction stir welding system 400 may further comprise one or more proximity sensors 446. The proximity sensors 446 may be configured to determine an insertion depth of the friction stir welding tool 402 into the parts 404, 406 along the joint 408. In one embodiment the proximity sensors 446 may comprise capacitive, Doppler effect, eddy-current, inductive, laser, magnetic, optical, radar, and/or sonar sensors, although various other embodiments of proximity sensors may be employed in other embodiments. A proximity sensing stack 448 comprising the proximity sensors 446 may extend along the length of the backing plate 442 (or at least a portion thereof) such that the proximity sensors extend along the length of the parts 404, 406 being welded. Accordingly, the proximity sensing stack 448 may be able to determine the insertion depth of the rotating friction stir welding tool 402 as it moves along the joint 408 between the parts 404, 406 being welded.

Figure 9:
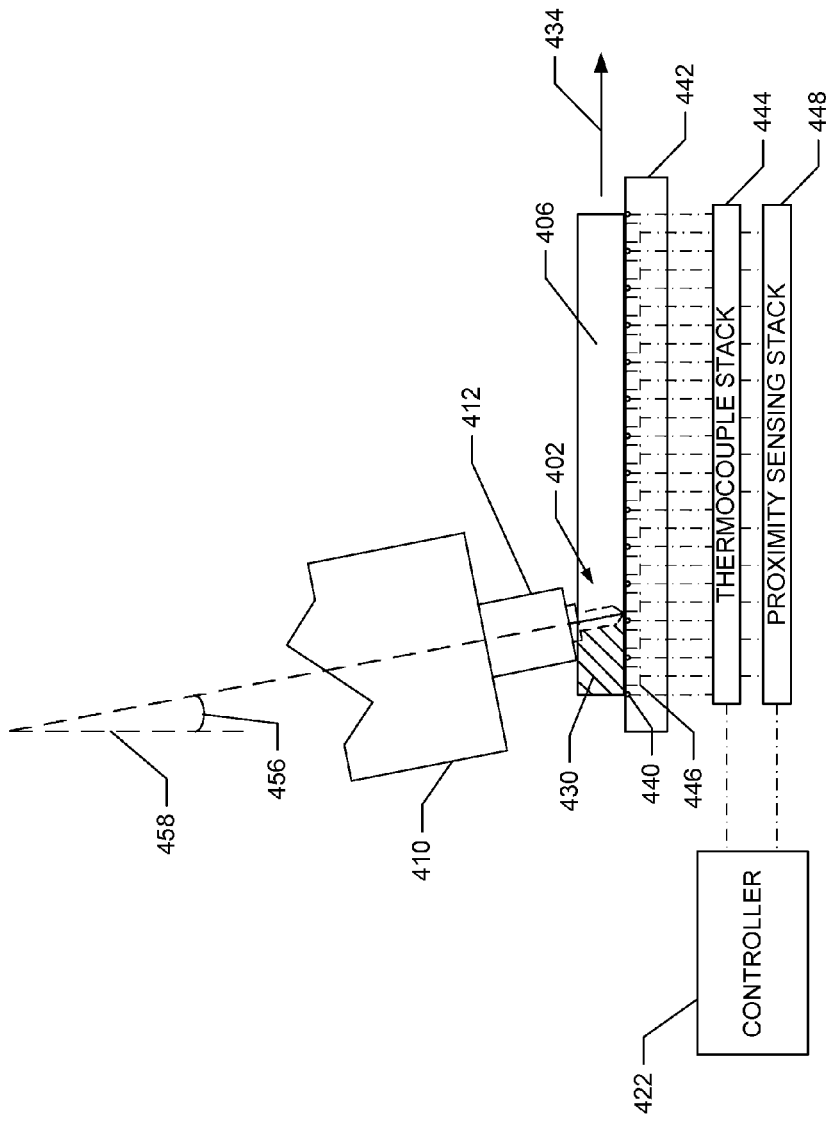
FIG. 9 illustrates a side view of a portion of the friction stir welding system of FIG. 4 comprising a plurality of temperature sensors and a plurality of proximity sensors mounted in a backing plate, the temperature sensors and the proximity sensors alternatingly disposed and aligned with a joint between parts being welded according to an example embodiment of the present disclosure.

As illustrated, the proximity sensors 446 may align with the joint 408 between the parts 404, 406 such that the proximity sensors align with the friction stir welding tool 402 during the friction stir welding operation. In this regard, the proximity sensors 446 may be employed in embodiments of the friction stir welding system 400 in which the temperature sensors 440 are perpendicularly displaced from the joint 408 between the parts 404, 406. Alternatively, as illustrated in FIG. 9, the temperature sensors 440 and the proximity sensors 446 may be mounted in the backing plate 442 such that they are alternatingly disposed along the length of the joint 408 between the parts 404, 406. Accordingly, various mounting options for the temperature sensors 440 and the proximity sensors 446 are provided.

The controller 422 (or a separate controller) may be configured to instruct the actuator 414 to dynamically adjust the insertion depth of the friction stir welding tool 402. More particularly, the controller 422 may be configured to instruct the actuator 414 to decrease an insertion depth differential between the insertion depth measured by the proximity sensors 446 and a desired insertion depth while directing the rotating friction stir welding tool 402 along the joint 408 between the parts 404, 406. In this regard, due to variations in material thickness and shape of the parts 404, 406 within manufacturing tolerances, the friction stir welding tool 402 may otherwise extend into the joint 408 between the parts 404, 406 to an insertion depth that is either too great or too little.

If the friction stir welding tool 402 does not extend far enough into the joint 408 between the parts 404, 406, an incomplete weld may be formed that is of lower strength than desired. Alternatively, if the friction stir welding tool 402 extends too far into the joint 408 between the parts 404, 406, the friction stir welding tool may contact the backing plate 442, which could cause damage to the friction stir welding tool, the backing plate, and/or sensors in the backing plate such as the temperature sensors 440. Accordingly, by actively controlling the insertion depth of the friction stir welding tool 402, theses problems may be avoided.

As noted above, various process parameters may be adjusted to reach a desired temperature of the weld 430 resulting from the friction stir welding process. In this regard, the controller 422 (or an alternate controller) may be configured to adjust one or more of the process parameters to decrease a temperature differential between the temperature measured by the temperature sensors (e.g., sensors 424, 426 and/or 440) and a desired temperature of the weld. The desired temperature of the weld 430 may be empirically determined, as described above, to correspond to a temperature at which the parts 404, 406 plasticize.

Accordingly, the controller 422 may adjust one or more process parameters to reach the desired temperature and plasticize the material defining the parts 404, 406 at the joint 408 to form a weld. Various process parameters may be adjusted. By way of example, the process parameters may include the feed rate of the friction stir welding tool 402 along the joint 408, the rotational speed of the friction stir welding tool, and/or the axial force applied along the length of the friction stir welding tool.

The feed rate (transverse speed of the friction stir welding tool 402) may be determined by sensors included within the actuator 414 that allow the controller 422 to control the position of the friction stir welding tool. The change in position of the friction stir welding tool 402 divided by the change in time associated therewith may be calculated by the controller to determine the feed rate. Alternatively, a separate sensor may be employed to determine the feed rate. For example, FIG. 4 illustrates a follower wheel sensor 450 configured to determine the feed rate by rotating against one or both of the parts and transmitting detected rotations to the controller 422, which may then determine the distance traveled per unit of time. However, various other embodiments of sensors configured to determine the relative feed rate of the friction stir welding tool 402 may be employed, such as optical sensors.

As further illustrated in FIG. 4, a rotational speed sensor 452 may be configured to determine the rotational speed of the friction stir welding tool 402. For example, the rotational speed sensor 452 may comprise a Hall effect sensor configured to detect rotations of the friction stir welding tool, although various other embodiments of rotational sensors may be employed. Further, the friction stir welding system 400 may additionally include a force sensor 454 configured to determine the axial force applied by the actuator 414 along the friction stir welding tool 402 against the parts 404, 406 being welded. For example, in one embodiment the force sensor 454 may comprise a strain gauge. Note that the sensors 450, 452, 454 described above that are configured to detect various process parameters are not illustrated in the remaining figures for clarity purposes.

Accordingly, by detecting the various process parameters, one or more of the process parameters may be adjusted to reach a desired temperature of the weld 430 at which the parts 404, 406 plasticize. For example, in an instance in which the measured temperature of the weld 430 is less than the desired temperature, the process parameters may be dynamically adjusted by one or more of increasing the rotational speed, increasing the axial force, and decreasing the feed rate. Conversely, in an instance in which the temperature is greater than the desired temperature, dynamically adjusting one or more of the process parameters may comprise one or more of decreasing the rotational speed, decreasing the axial force, and increasing the feed rate. In this regard, increased rotational speed, axial force, and feed rate may generally cause the weld temperature to increase, whereas decreased rotational speed, axial force, and feed rate may generally cause the weld temperature to decrease. Accordingly, the controller 422 may adjust the process parameters during the friction stir welding process to achieve the desired temperature of the weld 430.

As illustrated in FIGS. 6 and 9, a tilt angle 456 of the friction stir welding tool 402 may also be adjusted. In this regard, the friction stir welding tool 402 may be titled relative to a vertical direction 458 such that an end tip of the friction stir welding tool is pointed in the welding direction 434. Decreasing the tilt angle 456 of the friction stir welding tool 402 may increase the force component applied perpendicularly to the surface of the parts 404, 406 along the joint 408, whereas increasing the tilt angle may decrease the force component applied perpendicularly to the surface of the parts along the joint. Any effects on the temperature of the weld 430 resulting from changing the tilt angle 456 of the friction stir welding tool 402 may be empirically determined and the tilt angle may be adjusted accordingly.

The controller 422 may be configured to adjust the process parameters within certain constraints. The constraints may be based on limits of the friction stir welding system 400. For example, the motor 410 may have a maximum rotational speed, and the actuator 414 may have limits with respect to the maximum axial force it can apply and a maximum feed rate. Constraints may also be user defined. For example, a minimum feed rate may be inputted to ensure that the friction stir welding operation conforms to a desired throughput rate.

Figure 10:
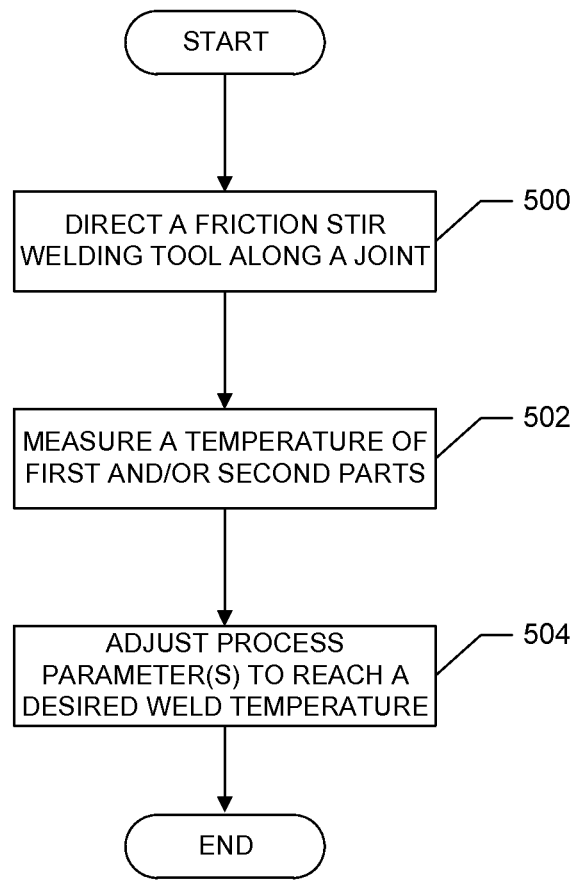
FIG. 10 illustrates a method for friction stir welding according to an example embodiment of the present disclosure.

A related friction stir welding method is also provided. As illustrated in FIG. 10, the method may include directing a rotating friction stir welding tool along a joint between a first part and a second part to form a weld therebetween at operation 500. Further, the method may include measuring a temperature of at least one of a first part and a second part at operation 502. Additionally, the method may include dynamically adjusting one or more of a plurality of process parameters to decrease a temperature differential between the temperature and a desired temperature of the weld while directing the rotating friction stir welding tool along the joint, wherein the process parameters comprise an axial force, a feed rate, and a rotational speed of the friction stir welding tool at operation 504.

In some embodiments the process parameters may further comprise a tilt angle of the friction stir welding tool. Additionally, dynamically adjusting one or more of the process parameters at operation 504 may comprise one or more of increasing the rotational speed, increasing the axial force, and decreasing the feed rate in an instance in which the temperature is less than the desired temperature. Further, dynamically adjusting one or more of the process parameters at operation 504 may comprise one or more of decreasing the rotational speed, decreasing the axial force, and increasing the feed rate in an instance in which the temperature is greater than the desired temperature.

Figure 11:
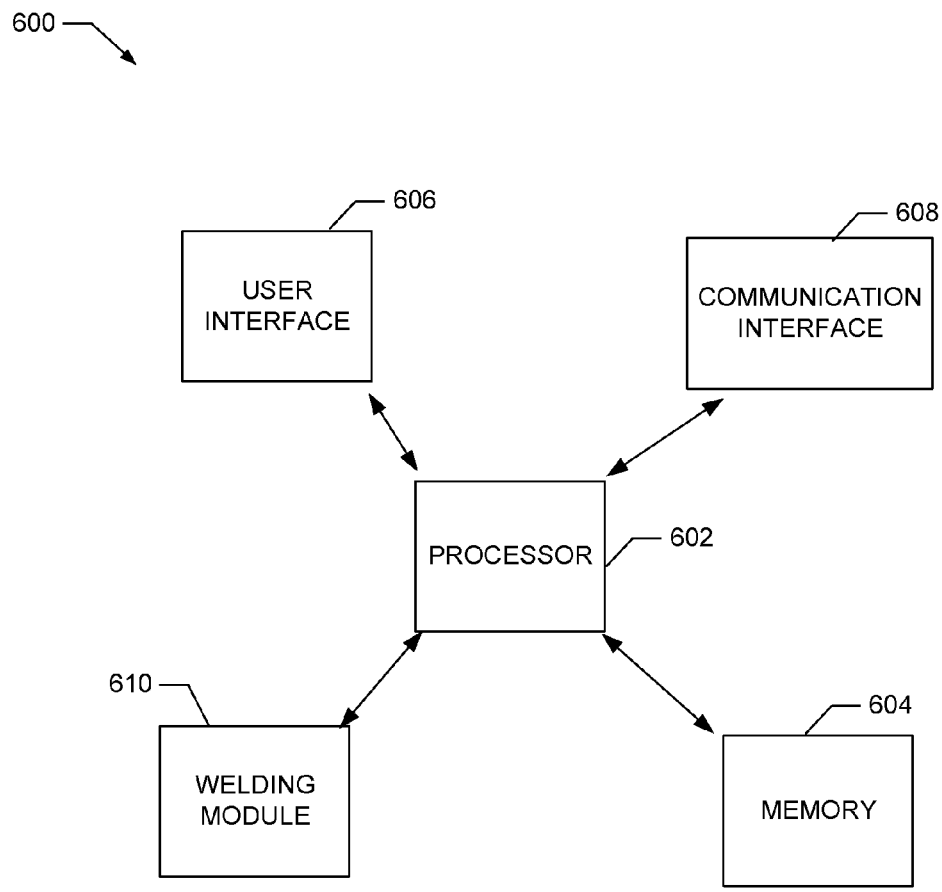
FIG. 11 illustrates a block diagram of an electronic device according to an example embodiment of the present disclosure.

The method may further comprise determining a plurality of temperature response curves based on a change in the axial force, a change in the rotational speed and a change in the feed rate. In this regard, dynamically adjusting one or more of the process parameters at operation 504 may comprise dynamically adjusting one or more of the process parameters based on the temperature response curves. Determining the temperature response curves may comprise empirically determining the temperature response curves or determining the temperature response curves via finite element analysis. The method may also include measuring an insertion depth of the rotating friction stir welding tool and dynamically adjusting the insertion depth to decrease an insertion depth differential between the insertion depth and a desired insertion depth while directing the rotating friction stir welding tool along the joint FIG. 11 is a block diagram of an electronic device 600 suitable for use with the described embodiments. In one example embodiment the electronic device 600 may be embodied in or as the controller 422 for the friction stir welding system 400. In this regard, the electronic device 600 may be configured to control or execute the above-described preheating and/or cooling rate regulating operations.

The electronic device 600 illustrates circuitry of a representative computing device. The electronic device 600 may include a processor 602 that may be microprocessor or controller for controlling the overall operation of the electronic device 600. In one embodiment the processor 602 may be particularly configured to perform the functions described herein. The electronic device 600 may also include a memory device 604. The memory device 604 may include non-transitory and tangible memory that may be, for example, volatile and/or non-volatile memory. The memory device 604 may be configured to store information, data, files, applications, instructions or the like. For example, the memory device 604 could be configured to buffer input data for processing by the processor 602. Additionally or alternatively, the memory device 604 may be configured to store instructions for execution by the processor 602.

The electronic device 600 may also include a user interface 606 that allows a user of the electronic device 600 to interact with the electronic device. For example, the user interface 606 can take a variety of forms, such as a button, keypad, dial, touch screen, audio input interface, visual/image capture input interface, input in the form of sensor data, etc. Still further, the user interface 606 may be configured to output information to the user through a display, speaker, or other output device. A communication interface 608 may provide for transmitting and receiving data through, for example, a wired or wireless network such as a local area network (LAN), a metropolitan area network (MAN), and/or a wide area network (WAN), for example, the Internet.

The electronic device 600 may also include a welding module 610. The processor 602 may be embodied as, include or otherwise control the welding module 610. The welding module 610 may be configured for controlling or executing friction stir welding operations including, for example, the dynamic adjustment of friction stir welding process parameters as described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling machining operations. In this regard, a computer readable storage medium, as used herein, refers to a non-transitory, physical storage medium (e.g., a volatile or non-volatile memory device, which can be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A friction stir welding method, comprising:
   directing a rotating friction stir welding tool along a joint between a first part and a second part to form a weld therebetween;
   measuring a temperature of at least one of a first part and a second part; and
   decreasing a temperature differential between the measured temperature and a desired temperature of the weld by dynamically adjusting one or more of a plurality of process parameters, the plurality of process parameters comprising an amount of axial force applied by the friction stir welding tool along the joint, a feed rate of the friction stir welding tool along the joint and a rotational speed of a tip portion of the friction stir welding tool,
   wherein the dynamic adjusting is in accordance with a temperature response curve that describes expected temperature changes in response to adjustments of at least one of the plurality of process parameters.

2. The method of claim 1, wherein the process parameters further comprise a tilt angle of the friction stir welding tool.

3. The method of claim 1, wherein dynamically adjusting one or more of the process parameters comprises one or more of increasing the rotational speed, increasing the axial force, and decreasing the feed rate in an instance in which the temperature is less than the desired temperature.

4. The method of claim 1, wherein dynamically adjusting one or more of the process parameters comprises one or more of decreasing the rotational speed, decreasing the axial force, and increasing the feed rate in an instance in which the temperature is greater than the desired temperature.

5. The method of claim 1, wherein the temperature response curve is empirically determined.

6. The method of claim 1, wherein the temperature response curve is determined by finite element analysis.

7. The method of claim 1, further comprising measuring an insertion depth of the rotating friction stir welding tool; and
   dynamically adjusting the insertion depth to decrease an insertion depth differential between the insertion depth and a desired insertion depth while directing the rotating friction stir welding tool along the joint.

8. A system for friction stir welding, comprising:
   a friction stir welding tool configured to friction stir weld a first part to a second part along a joint;
   a motor configured to rotate the friction stir welding tool at a rotational speed;
   an actuator configured to apply an axial force along the friction stir welding tool against the first part and the second part and displace the friction stir welding tool relative to the first part and the second part along the joint;
   one or more sensors configured to measure a temperature of at least one of the first part and the second part; and
   a controller configured to dynamically adjust one or more of a plurality of process parameters in accordance with a temperature response curve to decrease a temperature differential between the temperature measured by the sensors and a desired temperature of the weld while the friction stir welding tool is directed along the joint,
   wherein the process parameters comprise the axial force, a feed rate, and the rotational speed of the friction stir welding tool,
   wherein the temperature response curve defines a relationship between changes in at least one of the plurality of process parameters and the measured temperature of at least one of the first part and the second part.

9. The system of claim 8, wherein the sensors are mounted along the joint.

10. The system of claim 9, wherein the sensors are perpendicularly displaced from the joint.

11. The system of claim 9, wherein the sensors are mounted in a backing plate.

12. The system of claim 9, wherein the actuator is further configured to control a tilt angle of the friction stir welding tool, and the process parameters further comprise the tilt angle.

13. The system of claim 9, further comprising a proximity sensor configured to measure an insertion depth of the rotating friction stir welding tool, wherein the controller is further configured to instruct the actuator to dynamically adjust the insertion depth to decrease an insertion depth differential between the insertion depth measured by the proximity sensor and a desired insertion depth while directing the rotating friction stir welding tool along the joint.

14. A non-transitory computer readable medium for storing computer instructions executed by a processor in a controller configured to control a friction stir welding system, the non-transitory computer readable medium comprising:
    computer code for directing a rotating friction stir welding tool along a joint between a first part and a second part to form a weld therebetween;
    computer code for measuring a temperature of at least one of a first part and a second part; and
    computer code for decreasing a temperature differential between the measured temperature and a desired temperature of the weld by dynamically adjusting one or more of a plurality of process parameters, the plurality of process parameters comprising an amount of axial force applied by the friction stir welding tool along the joint, a feed rate of the friction stir welding tool along the joint and a rotational speed of a tip portion of the friction stir welding tool,
    wherein the dynamic adjusting is in accordance with a temperature response curve that provides expected temperature changes of the weld in response to an adjustment of at least one of the plurality of process parameters.

15. The non-transitory computer readable medium of claim 14, wherein the process parameters further comprise a tilt angle of the friction stir welding tool.

16. The non-transitory computer readable medium of claim 14, wherein the computer code for dynamically adjusting one or more of the process parameters comprises computer code for one or more of increasing the rotational speed, increasing the axial force, and decreasing the feed rate in an instance in which the temperature is less than the desired temperature.

17. The non-transitory computer readable medium of claim 14, wherein the computer code for dynamically adjusting one or more of the process parameters comprises computer code for one or more of decreasing the rotational speed, decreasing the axial force, and increasing the feed rate in an instance in which the temperature is greater than the desired temperature.

18. The non-transitory computer readable medium of claim 14, wherein the temperature response curve is empirically determined.

19. The non-transitory computer readable medium of claim 14, wherein the temperature response curve is determined by finite element analysis.

20. The non-transitory computer readable medium of claim 14, further comprising computer code for measuring an insertion depth of the rotating friction stir welding tool; and
    computer code for dynamically adjusting the insertion depth to decrease an insertion depth differential between the insertion depth and a desired insertion depth while directing the rotating friction stir welding tool along the joint.

* * * * *